W. H. MASTERS.
Solar Camera.
No. 4,136.
Reissued Sept. 27, 1870.
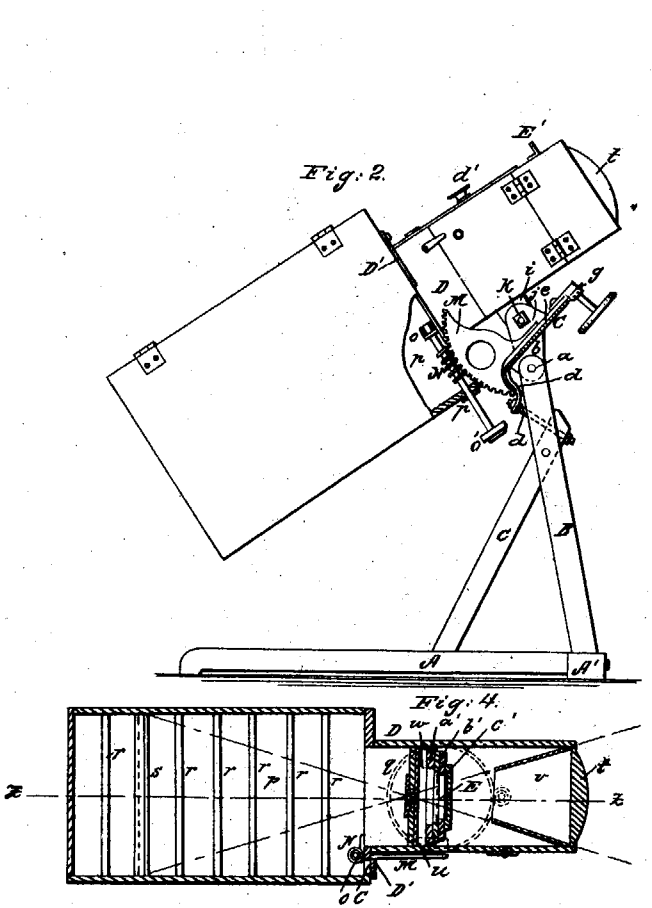
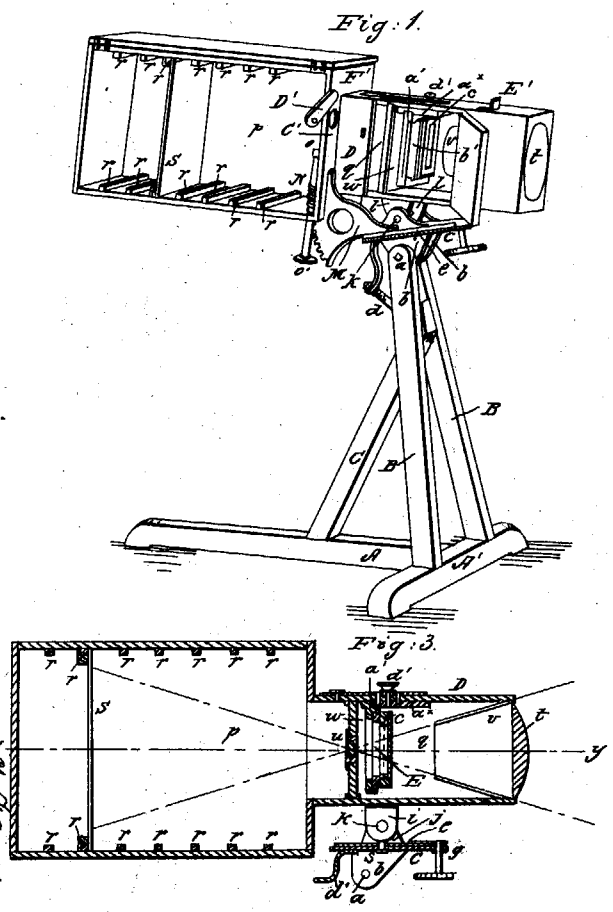
Witnesses:
Philip C. Dieterich.
Thos. J. Parker.
Inventor: W. H. Masters.
By his Atty.
R. D. O. Smith.
N. PETERS, Photo-Lithographer, Washington, D. C.

United States Patent Office.

W. H. MASTERS, OF PRINCETON, ILLINOIS.

Letters Patent No. 59,917, dated November 20, 1866; reissue No. 4,136, dated September 27, 1870.

IMPROVEMENT IN SOLAR CAMERAS.

The Schedule referred to in these Letters Patent and making part of the same

*To all whom it may concern:*

Be it known that I, W. H. MASTERS, of Princeton, Bureau county and State of Illinois, have invented a new and useful Improvement in Solar Cameras; and I do hereby declare that the following is a full, clear, and exact description thereof, which will enable others skilled in the art to make use of the same, reference being had to the accompanying drawings forming part of this specification, in which—

Figure 1 is a perspective view of my apparatus, the box being level.

Figure 2 represents a side elevation of this apparatus, partly in section.

Figure 3 is a longitudinal vertical section of the same, the line *z z*, fig. 4, indicating the plane of section.

Figure 4 is a horizontal section of the same, taken in the plane indicated by the line *y y*, fig. 3.

This invention relates to a solar camera, for printing photographic pictures, and for other purposes, which is provided with suitable gear, whereby the same can be set, to correspond to the position of the sun, at any moment, and retained in said relative position by a single movement, so that the full benefit of the sun's rays is obtained, and clear and distinct pictures can be produced in a comparatively short time.

A conical shield, close behind the condensing lens in the mouth of the upper chamber of the camera-box, in combination with a diaphragm in front of the small lens, prevents the rays of light from being concentrated on any portion of the wood-work, and thereby the box is rendered comparatively fire-proof.

The lower or printing-chamber is supplied with cleats on the upper and lower sides, which form the guides for the paper screen, and keep the same in place while the printing is going on, and the negative-holder is composed of three distinct frames, which allow of adjusting the negative in the proper focus with the greatest ease and facility.

A represents a stand, made of wood or any other suitable material, from which rise two uprights, B B, which may be held in position by a brace, C.

This camera is, in a certain degree, an astronomical instrument, and therefore the stand upon which it is supported must be adjusted with accuracy. When placed for use, the part A must be placed in the plane of the meridian, and the part A′ must be accurately leveled. If these two conditions are not observed, the operation of the instrument will be imperfect.

The upper ends of the uprights B form the bearings for a rod, *a*, which passes through ears or branches *b b*, secured to the under surface of a disk, *c*, which moves upon said rod *a*, as an axis in securing the equatorial adjustment of the instrument.

The disk *c* forms the equatorial plane of the instrument, and it is to be made parallel with the plane of the equator, by adjusting it for the latitude of the location where the instrument is to be used.

This equatorial adjustment is secured by means of the screw-rod *d*, which is attached to the stand, and projects upward in a position convenient to pass through an arm, *d′*, which projects from the disk *c*. Set-nuts on the upper and lower sides of the arm *d′* serve to clamp it any point, so that said disk may be inclined and held at any angle to the horizon that may be required. When once adjusted, it never needs re-adjusting while in the same latitude. Thus, if the camera is adjusted for use at the equator, the disk *c* is required to be in a perpendicular position; at the poles the position would necessarily be horizontal, and at any intermediate latitude the disk *c* is inclined in proportion to the degree of latitude where used. For instance, at New Orleans, a latitude of 30°, the inclination of the disk would be 30°, while at St. Paul, a latitude of 45°, the inclination will be 45° from the equator, the degree of latitude always indicating the degree of inclination of the disk. Therefore it is only in reference to the degree of latitude of the locality where used that the disk *c* ever requires to be adjusted.

The disk *c* is provided with cogs, extending wholly or partially around its circumference, said cogs meshing with the teeth of the pinion *g*, which is secured, by suitable bearings, to the disk *e*, which rests and moves upon the upper surface of the disk *c*.

The disks *c* and *e* are connected, at their centers, by a pivot, *f*, fig. 3, around which the disk *e* revolves, when actuated by power transmitted through the pinion *g*. I do not confine myself to the above gearing for the rotary motion, as the pinion *g* may be secured to the disk, and plate *e* be supplied with cogs, instead of the disk *c*.

From the plate *e* rise two lugs or ears, *j′*, which form the bearings for the horizontal pivot-rod *k*, upon which, as an axis, the box D may be moved up and down in a vertical plane.

The bracket *l*, secured to the lower side of the box D, forms the bearing of said box upon the pivot-rod *k*.

In order to adjust the box in the desired inclination, a segmental arm, *m*, extends from the plate *e*, the edge of which is provided with cogs, which gear with an endless screw, *n*. This screw has its bearings in a lug, *o*, on the inner surface of the lower box or printing-chamber, and in a plate, $p^{\times}$, at its bottom, and it is provided with a head, $o^{*}$, so that said screw can be turned conveniently in either direction.

By the action of the pinion *g* and disk *e* the box D can be revolved in an equatorial plane, and by the screw *n* and segmental arm *m* it can be moved in a vertical plane, and its position can thus be adjusted with the greatest ease and convenience.

The box is divided in two compartments, *p q*.

The compartment *p*, which forms the printing-chamber, and which is somewhat larger than the compartment *q*, is provided with strips *r*, on top and bottom of the inner surface, which form the guides for the paper shield *s*.

The compartment *q* contains the lenses *t u*, one at or near its mouth, and the other at some distance from the first, as shown in figs. 4 and 3. The large lens, *t*, serves to collect the rays of the sun, and to concentrate the same in the axis or central part of the small lens, *u*, by which they are spread on the paper, which is fastened on the shield *s*.

In order to prevent the rays, or any portion of them, from being concentrated on some portion of the wood-work, and to set fire to the same, I have applied a conical shield, *v*, close behind the large lens *t*, and a diaphragm, *w*, of metal or other suitable non-combustible material, close in front of the small lens *u*, the shield *v* being so shaped that it prevents any of the rays from going astray.

Between the two lenses *t* and *u* is the negative-holder E, which is composed of three distinct frames, *a′ b′ c′*.

The frame *a′* is secured to a slide, *a**, which straddles the top of the compartment *q*, which is provided with a set-screw, *d′*, that serves to fasten the same in any desired position, and also to move it up and down in the direction of the longitudinal axis of the box D.

The frame *b′* is fitted into dovetailed guide-ways in the frame *a′*, and it is so arranged that it can be moved in a transverse direction, and the frame *c′* is fitted into dovetailed guide-ways in the frame *b′*, and the direction in which it can be moved is up and down, and at right angles to the direction in which the frame *b′* moves.

Suitable friction-springs, attached to the edges of the frames *b′* and *c′*, keep the same in the desired position.

The negative is secured to the frame *c′*, and, by the constant action of the three frames *a′ b′ c′*, said negative can be readily adjusted in the proper position in relation to the lenses *t u*. By this arrangement I am enabled to print clear and distinct pictures, of different size, from negatives.

A peep-hole, through which the adjustment of the focus or the progress of the operation of printing may be inspected, is made at C′, and covered by the flap D′, to prevent the entrance of light.

The small plate E′ is pierced with a small hole, through which a ray of light passes when the instrument is pointed toward the sun, and a small mark is made at a point, F′, (fig. 1,) where this ray of light, if parallel with the axis of the instrument, will fall upon the front end of the chamber *p*. This renders it easy to bring the axis of the instrument to the sun, at any time when the sun is visible.

The operation of my box is so simple that it can be readily understood by persons of ordinary mechanical skill, since, when the instrument is adjusted according to the declination of the sun, by means of the endless screw *n* and segment *m*, its axis may be made to follow the path of the sun, during the printing, by a single motion, obtained by pinion *g*, when placed in the plane of the meridian, as heretofore described.

To put the camera in position, the operator has only to level the stand, raise or lower the inclination of the disk *c*, by means of the screw-rod *d*, until the desired inclination is obtained, bringing its plane parallel to the equator, and when thus adjusted, the pivot *f* is always parallel to the poles of the earth. Thus we have a correct basis for the rotary motion. Then the instrument may be adjusted, in its vertical movement, by means of the endless screw *n*, acting upon the segmental arm *m*, without disturbing the position of the disk *c* and pivot *f*, and when properly adjusted, according to the above directions, the axis of the box D is made to point to the sun at any day in the year, or any hour in the day. Then, by rotating the camera, by means of the hand-wheel, the camera may be made to follow the path of the sun correctly all day, no matter what the inclination of the sun may be to the earth's plane, and by turning the endless screw *n* a very little each morning, the vertical adjustment is secured for the day. Thus the sun may be followed for a year without interrupting the position of the disk *c* and pivot *f*, as before stated.

I am aware that astronomical instruments have been mounted so as to revolve in an equatorial plane, and with an adjustment to any degree oblique to said plane, so that the axis of the instrument may be brought to coincide with the position of either of the heavenly bodies, and that, thenceforth, a revolution of the instrument upon its polar axis will cause it to follow the path of the heavenly body through the sky. The mechanisms used for these purposes have been, in an eminent degree, costly and complicated, because of the great range of adjustment required, and the extreme accuracy of movement necessary.

In equatorial mounting for telescopes the pedestal upon which the instrument is mounted is always prepared with its table actually parallel with the equator, so that, when the instrument is set, the polar axis will be in proper position, without special means of adjustment; but in instruments manufactured for the market, as solar cameras, it would be manifestly impossible to construct the stand for each one with reference to the exact latitude where each instrument was to be used, and in the equatorial adjustment herein shown this adjustment is the principal element of difference between my devices and the ordinary equatorial mountings.

No solar camera has hitherto been constructed with any equatorial mounting or adjustment whatever, and hence no camera hitherto constructed would follow the path of the sun for an entire day, without other adjustment than for declination.

What I claim as new, and desire to secure by Letters Patent, is—

1. A camera-stand, constructed with three independent adjustments, for the purpose of enabling the instrument to follow the path of the sun by a single motion, substantially as shown and described.

2. The adjusting-screws *d* and *h*, the disks *c* and *e*, and the pivots *a* and *k*, in combination, substantially as and for the purpose set forth.

3. The shielding cone *v* and diaphragm *w*, or their equivalents, between the lenses *t* and *u* of a solar camera, for the purposes set forth.

4. The indicator E′, arranged and operating, in connection with a gauge-mark, F′, as and for the purpose set forth.

W. H. MASTERS.

Witnesses:
CHAS. H. MASTERS,
H. W. IMMKE.